Figure 1:
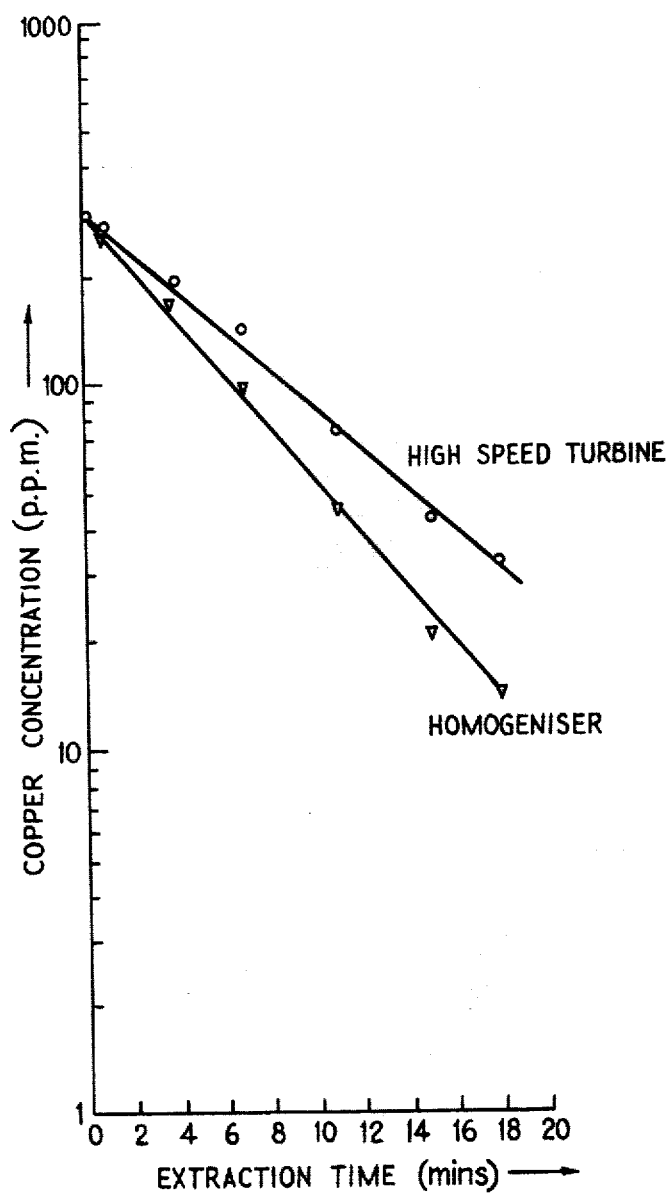

United States Patent [19]

Davies

[11] 4,283,290

[45] Aug. 11, 1981

[54] PURIFICATION UTILIZING LIQUID MEMBRANE WITH ELECTROSTATIC COALESCENCE

[75] Inventor: Graham A. Davies, Alderley Edge, England

[73] Assignee: Davy International (Oil & Chemicals) Ltd., London, England

[21] Appl. No.: 84,550

[22] Filed: Oct. 15, 1979

Related U.S. Application Data

[63] Continuation of Ser. No. 921,721, Jul. 3, 1978, abandoned, which is a continuation-in-part of Ser. No. 857,821, Dec. 5, 1977, abandoned.

[30] Foreign Application Priority Data

Jul. 6, 1977 [GB] United Kingdom ............... 28317/77

[51] Int. Cl.³ ............................................. B01D 13/00
[52] U.S. Cl. ..................................... 210/643; 210/708; 210/712; 210/748; 204/191; 204/302; 423/24
[58] Field of Search ................. 210/21, 22, 23 R, 511, 210/24, 73 R, 73 W, 38 R, 222, 243, DIG. 5, 643, 708, 712, 748, 805, 806; 423/24, DIG. 14; 204/186, 191, 302

[56] References Cited

U.S. PATENT DOCUMENTS

| Re. 28,002 | 4/1974 | Li ........................................... 210/22 |
| 3,779,907 | 12/1973 | Li et al. .................................. 210/22 |
| 4,039,404 | 8/1977 | Richards et al. ..................... 204/106 |
| 4,086,163 | 4/1978 | Cahn et al. ......................... 210/22 D |

OTHER PUBLICATIONS

Asher et al., "In Vivo Performance of Liquid Membrane Capsules", Trans. Amer. Soc. of Art. Int. Organs, vol. 22, 1976, pp. 605-610.

*Primary Examiner*—Charles N. Hart
*Assistant Examiner*—David R. Sadowski
*Attorney, Agent, or Firm*—Bernard, Rothwell & Brown

[57] ABSTRACT

A liquid membrane technique is disclosed for recovery of dissolved species from aqueous solutions thereof in which, by appropriate tailoring of the emulsion, electrostatic precipitation can be used successfully in the recovery of the species from the interior phase of the emulsion. The emulsion is so prepared that the droplet size of the interior phase of the emulsion is in the range of from about 0.3 micrometers to about 10 micrometers, with the majority of the droplets lying in the range of from about 0.8 micrometers to about 3 micrometers. The electrostatic field is preferably at least 1 kilovolt per centimeter up to 7.5 kilovolts per centimeter or more.

20 Claims, 3 Drawing Figures

PURIFICATION UTILIZING LIQUID MEMBRANE WITH ELECTROSTATIC COALESCENCE

This is a continuation of application Ser. No. 921,721, filed July 3, 1978, now abandoned, which is a continuation-in-part of my copending patent application Ser. No. 857,821, filed Dec. 5, 1977, now abandoned.

This invention relates to recovery of dissolved species from aqueous solutions thereof, employing a so-called "liquid membrane" technique.

"Liquid membrane" techniques were pioneered by Norman L. Li and his co-workers and have been described in a series of patent specifications including U.S. Pat. No. 3,779,907. This discloses a process for removal of a dissolved species by contacting the solution with a "water-in-oil" emulsion comprising an aqueous interior phase surrounded by a surfactant-containing hydrophobic exterior phase, the exterior phase being permeable to the dissolved species and the interior phase comprising a reactant capable of converting the dissolved species to a non-permeable species. It is said that in this way the dissolved species permeates the exterior phase and is converted to a non-permeable species in the interior phase. Following such contact the emulsion is then separated from the aqueous solution, which is now depleted in the dissolved species, and the emulsion may thereafter be regenerated. One method of regeneration of the emulsion is to break the emulsion, this being mentioned at column 7 line 29. However no method of breaking the emulsion is mentioned in U.S. Pat. No. 3,779,907.

In the aforementioned U.S. Pat. No. 3,779,907 it is suggested that copper can be separated from aqueous solution by using a water-in-oil emulsion comprising an aromatic or olefinic solvent as the exterior phase (column 3 lines 29 to 33). One method of converting the ions into the desired non-permeable form in the interior phase is to precipitate copper ions with sulphide ions (column 5 lines 1 to 6). A variant of this process involves maintenance of a pH differential between the interior phase and the aqueous solution, whereby the pH at the aqueous solution—exterior phase interface promotes the solubility of the ions in the ion exchange compound-containing exterior phase, and the pH at the exterior phase—interior phase interface promotes the desorption of the ions from the exterior phase and subsequent solubilising in the interior phase (column 5 lines 12 to 21). Amongst the surfactants suggested for use is Span 80 which is said to be a fatty acid ester of anhydro sorbitol condensed with ethylene oxide (column 5 lines 63 to 65).

The use of a liquid surfactant membrane in the desalination of water is disclosed by Li and co-workers in U.S. Pat. No. 3,454,489. In this process the salt solution is emulsified with a hydrophobic surfactant solution so that the salt solution to be treated forms the interior phase of an emulsion which is then contacted with a washing solvent. Water permeates through the surfactant membrane from the salt solution into the washing solvent. The emulsion, whose interior phase is now depleted in water, is separated from the washing solvent and passed to a demulsifier, which can take the form of an electrostatic precipitator. The process is said to be applicable to desalination of seawater "as well as extraction of ore or minerals from their aqueous solutions" (column 5 lines 34 to 36).

Other patents in the name of Li and his co-workers include U.S. Pat. Nos. 3,389,078, 3,410,794, 3,617,546, 3,637,488, 3,650,091, 3,696,028, 3,719,590, 3,733,776, 3,740,315, 3,740,329, 3,897,308, 3,942,527, 3,959,173, 3,969,265, and 4,014,785, as well as U.S. Pat. Nos. Re. 27,888 and 28,002.

Papers by Li and his co-workers on the subject of liquid membranes have also appeared in the literature; see, for example, Ind. Eng. Process Des. Develop., Vol. 10, No. 2, 1971, pp. 215-221 and Separation Science, 9 (6), pp 505-519, 1974.

Also in the name of Li et al is U.S. Pat. No. 4,001,109. This describes a process for demulsifying an emulsion which can be either of the water-in-oil or oil-in-water type. This process is said to be particularly useful for breaking emulsions in liquid membrane emulsion systems which are defined in the above-mentioned U.S. Pat. No. 3,779,907. The emulsions used in the various liquid membrane processes are said to be difficult to break. Li and his co-workers go on to state (column 2 line 63 to column 3 line 23): "The liquid membrane water treating process to function effectively requires a water-in-oil emulsion wherein the oil maintains its integrity as the continuous phase of the emulsion under various conditions of heat, pressure and agitation in order to function as a membrane. Thus the emulsions useful in this process are designed to be especially stable. The formation of stable liquid membrane emulsions is an art in itself and the difficulties and solutions to said difficulties may be found in U.S. Pat. No. 3,779,907 . . . . These emulsions, while suitable for liquid membrane processes because of their stability are to a great extent problematic when it comes to the breaking thereof to separate the oil and water phases for separate reclamation of the components present therein. Prior art emulsion breaking processes which include heating, polyvalent flocculating salts, electrostatic precipitation, centrifuging, are completely unsuitable for breaking these emulsions." Thus the teaching in the art is that the emulsions used in liquid membrane processes such as described in U.S. Pat. No. 3,779,907 cannot be broken by electrostatic precipitation.

In a liquid membrane process the emulsion is separated from the aqueous feed solution and must then be broken in order to recover the interior phase. In U.S. Pat. No. 4,001,109 Li and his co-workers teach that emulsions for use in liquid membrane techniques, such as are described in U.S. Pat. No. 3,779,907, must be formulated to be especially stable but that this means that breaking of the emulsion becomes problematic. The solution that is therefore proposed involves addition of a mixture of solvents which in turn means that such solvents must be recovered, e.g. by distillation, from the separated phases of the emulsion. Such a proposal is thus relatively complicated and, since distillation is involved, it requires a considerable energy consumption.

There is thus a need for a liquid membrane process in which emulsion breaking can be simply effected without addition of further solvents or other chemicals to the system and without the expenditure of excessive amounts of energy.

It has now surprisingly been found that, if the emulsion is suitably tailored, it is possible to utilise successfully a liquid membrane process in the extraction of dissolved species from aqueous solutions thereof and to recover such species by a process which involves breaking the emulsion by means of electrostatic precipitation.

It has also surprisingly been found that, by making the emulsion so as to produce a relatively small droplet size of interior phase and a relatively narrow distribution of droplet sizes, the stability of the emulsion during contact with the aqueous feed solution is improved without the need to add excessive amounts of surfactant or to add viscosity-increasing additives and at the same time the kinetics of mass transfer through the liquid membrane are significantly improved.

According to the present invention there is provided a process for recovery of a dissolved species from an aqueous solution thereof which comprises: contacting the aqueous solution with an emulsion, which emulsion comprises droplets of an aqueous interior phase surrounded by a hydrophobic exterior phase which is immiscible with the aqueous solution and is permeable to said species, the aqueous interior phase comprising a component capable of rendering said species non-permeable, and the droplet size of the interior phase in the emulsion lying in the range of from about 0.3 to about 10 micrometers with the majority of the droplets lying in the range of from about 0.8 to about 3 micrometers, whereby said species permeates the exterior phase and is rendered non-permeable in the interior phase, separating emulsion from the aqueous solution now depleted in said species, passing separated emulsion to an electrostatic coalescence zone in which an electrostatic field is maintained, whereby coalescence of droplets of the aqueous interior phase is promoted, and recovering from the electrostatic coalescence zone coalesced interior phase containing said species.

The invention further provides a continuous process for the recovery of a dissolved species from an aqueous feed solution thereof comprising supplying to an emulsification zone a hydrophobic exterior phase which is immiscible with the aqueous solution and is permeable to said species and an aqueous interior phase which comprises a component adapted to promote the desorption of said species from the exterior phase into the interior phase, mixing the interior and exterior phases in said emulsification zone so as to form therein a water-in-oil type emulsion having an interior phase droplet size in the range of from about 0.3 micrometers up to about 10 micrometers with the majority of the droplets lying in the range of from about 0.8 to about 3 micrometers, contacting the aqueous solution with the water-in-oil type emulsion in a contact zone, whereby said species permeates the exterior phase and is rendered non-permeable in the interior phase, separating emulsion from the aqueous solution in a separation zone, the aqueous solution now being depleted in said species, passing separated emulsion to an electrostatic coalescence zone in which an electrostatic field corresponding to a voltage drop of at least 1 kilovolt per centimeter is maintained, whereby coalescence of droplets of the interior phase is promoted, recovering from the electrostatic coalescence zone exterior phase and coalesced interior phase containing said species, and recycling exterior phase to the emulsification zone.

It will be seen that the invention utilises a liquid membrane process for the recovery of the dissolved species from the aqueous feed solution, the internal phase containing a component capable of rendering the species non-permeable. Such a component can be a reagent that reacts with the species to transform this in the interior phase into a non-permeable form. For example, if the dissolved species comprises ammonia or an amine, the interior phase may be an acidic solution having a pH less than that of the aqueous solution, the ammonia or amine reacting with the hydrogen ions to form ammonium or substituted ammonium ions. If the dissolved species comprises a metal ion, the interior phase may contain an anion that forms a precipitate with the metal ion.

Alternatively the component capable of rendering the species non-permeable can be one that promotes desorption of the species from the exterior phase into the interior phase. Thus, for example, if the dissolved species comprises a metal, such as copper, and the feed solution is a cupric sulphate solution, the interior phase can be an acidic solution having a lower pH than that of the aqueous feed solution.

The hydrophobic exterior phase of the emulsion is chosen to be permeable to the dissolved species and to provide a water-in-oil type of emulsion that is sufficiently stable to survive the contacting step with the aqueous feed solution containing the dissolved species essentially intact, but not so stable an emulsion that it cannot readily be broken by electrostatic coalescence in the presence of the electrostatic field maintained in the electrostatic coalescence zone. Thus extreme stability of the emulsion is desirably avoided in the process of the invention.

Generally speaking the hydrophobic exterior phase will usually comprise an oil-soluble, water-insoluble surfactant as emulsifier. Usually it will also comprise a transport agent for the dissolved species. Additionally it may comprise an inert hydrophobic solvent and one or more further minor additives such as an accelerator for the transport agent.

The process is applicable to any dissolved species (solute) that can be rendered permeable in the hydrophobic water-immiscible exterior phase and can be rendered non-permeable in the aqueous interior phase. Preferably the species is ionic. Thus the species may be any ionic species that is recoverable by ion exchange processes. The species may be anionic or cationic in nature.

As examples of cationic species that can be recovered using the process of the present invention, there can be mentioned silver, cadmium, chromium, lead, tin, mercury, copper, calcium, zinc, uranium, cobalt, iron and nickel. The process can be used in the removal of chromium ions from cooling water, and for the removal of iron from clay slurries, for example. The process is of particular importance in the recovery of copper from solutions thereof.

Using the process of the invention, copper can be recovered from a wide variety of copper-containing liquors. The process is, however, of particular advantage in the recovery of copper from ore leach liquors and from vat leach liquors as well as from raffinates from solvent extraction plants and other waste liquors. Typically, copper-containing ore leach liquors are generated by contacting a copper-containing ore with an acid solution, for example a solution of dilute sulphuric acid, or with an ammoniacal solution, for example an ammoniacal solution of ammonium carbonate. Such copper-containing ore leach water-immiscible exterior phase and can be rendered non-permeable in the aqueous interior phase. Preferably the species is ionic. Thus the species may be any ionic species that is recoverable by ion exchange processes. The species may be anionic or cationic in nature.

As examples of cationic species that can be recovered using the process of the present invention, there can be mentioned silver, cadmium, chromium, lead, tin, mercury, copper, calcium, zinc, uranium, cobalt, iron and nickel. The process can be used in the removal of chromium ions from cooling water, and for the removal of iron from clay slurries, for example. The process is of particular importance in the recovery of copper from solutions thereof.

Using the process of the invention, copper can be recovered from a wide variety of copper-containing liquors. The process is, however, of particular advantage in the recovery of copper from ore leach liquors and from vat leach liquors as well as from raffinates from solvent extraction plants and other waste liquors. Typically, copper-containing ore leach liquors are generated by contacting a copper-containing ore with an acid solution, for example a solution of dilute sulphuric acid, or with an ammoniacal solution, for example an ammoniacal solution of ammonium carbonate. Such copper-containing ore leach liquors may contain from about 4 parts per million or less up to about 3000 parts per million or more of copper (corresponding to about 10 parts per million of copper sulphate or less up to about 7500 parts per million or more of copper sulphate, in the case of a copper-containing sulphuric acid leach liquor). Vat leach liquors may contain for example up to about 30,000 parts per million of copper (or up to about 75,000 parts per million of copper sulphate, in the case of a sulphuric acid-containing vat leach liquor). Ammonium salt solutions, such as ammonium carbonates can alternatively be used as the leaching solution in place of sulphuric acid in either case.

As examples of anionic species that can be recovered using the process of the present invention there can be mentioned cyanide, nitrate, sulphate, chloride ions and complex metal-containing anions (such as $[UO_2(SO_4)_3]''''$, $CuCl_2'$, $CuCl_3'$, $ZnCl_3'$, $FeCl_3'$ and $FeCl_4'$), and the like. The process is applicable, for example, to removal of cyanide ions from waste waters.

The surfactant must be an oil-soluble, water-insoluble surfactant. Preferably the surfactant has an HLB (hydrophilic-to-lyophilic balance) ratio in the range of from about 1.75 up to about 7. HLB ratios can be calculated by one of two methods. The first method is the so-called "group contributions method" which is described by Davies in "Proceedings of the Second International Congress on Surface Activity" Vol. 1, page 426 (1957). The HLB ratio of surfactants can also be determined by an experimental method described by Griffin (see J. Soc. of Cosmetic Chemists, Vol. 1, page 311 (1949) and Vol. 5, page (1954)). For most surfactants there is normally good agreement between the HLB ratios determined by the group contributions method and by the above-mentioned experimental method described by Griffin.

Preferably the HLB ratio of the surfactant lies in the range of from about 3.5 to about 6.

Typical oil-soluble surfactants that can be used in the process of the invention include sorbitan monolaurate, sorbitan mono-oleate, the sorbitol monoester sold under the trade designation "Crill 4" by Croda Chemicals Limited, and the materials sold under the trade designations Span 20, Span 80 and Tween. According to the manufacturers' literature the Span materials are sorbitan fatty acid esters. The material sold as Span 80 is a fatty acid ester of anhydro sorbitol, whilst the material sold as Tween is an ethylene oxide adduct of such an ester, it is believed.

Other oil-soluble surfactants having an HLB ratio lying within the range of from 1.75 to about 7 include sorbitan monopalmitate, glycerol monostearate and propylene glycol monostearate. Sorbitan monopalmitate has an HLB value of about 6.7. Propylene glycol monostearate is somewhat anomalous giving an HLB ratio of 3.4 by the experimental method of Griffin and an HLB ratio of 1.8 determined by the group contributions method.

The exterior phase of the emulsion usually comprises a water-immiscible inert solvent, as well as one or more oil-soluble surfactants. Typical water-immiscible inert solvents include hydrocarbons, halogenated hydrocarbons, ethers, higher oxygenated compounds such as alcohols, ketones, and esters and the like. Preferably the solvent comprises a hydrocarbon or a halogenated hydrocarbon. Typical hydrocarbons include both aliphatic and aromatic hydrocarbons which may be saturated or may contain one or more unsaturated groups. Thus essentially any liquid hydrocarbon solvent can be used that will dissolve the surfactant and the transport agent. Amongst suitable hydrocarbons there can be mentioned hexane, hexene, octane, octene, cyclohexane, benzene, toluene, xylenes, mesitylene, n-butyl benzene, and mixtures of two or more thereof, as well as kerosene and the various commercially available hydrocarbon mixtures produced for example by distillation of petroleum. As typical of such solvents can be mentioned "Shell Solvent L" (an aliphatic non-polar hydrocarbon mixture), "Shell Solvent T" (an aromatic non-polar hydrocarbon mixture), "Napoleum 470", "Esso Escaid", the refined isoparaffins sold by Exxon Chemical Company such as Solvent Neutral 100, Solvent Neutral 150, Solvent Neutral 600 and the various grades in between, and the like.

As examples of halogenated hydrocarbons there can be mentioned "Arklone P" (i.e. trifluorotrichloroethane), chloroform, carbon tetrachloride, fluorobenzene, chlorobenzene, bromobenzene, o- and p-dichlorobenzene, hexachloroethane, perchloroethylene, and trichloroethylene, and the like, and mixtures thereof.

The solvent, of course, must be liquid at the conditions at which the process is operated, and also must be capable, in conjunction with a surfactant, of forming a suitable water-in-oil emulsion with the interior phase.

The transport agent will be chosen to be suitable for the nature of the dissolved species that it is desired to recover from the aqueous solution. Such transport agents are soluble in the water-immiscible exterior phase and are capable of interaction with the dissolved species at the aqueous solution-exterior phase interface to solubilise the dissolved species and are added in order to promote the permeation of the species through the exterior phase.

If it is desired to remove cations from an aqueous solution, a suitable ion exchange material may advantageously be incorporated in the exterior phase. Such an ion isoparaffins sold by Exxon Chemical Company such as Solvent Neutral 100, Solvent Neutral 150, Solvent Neutral 600 and the various grades in between, and the like.

As examples of halogenated hydrocarbons there can be mentioned "Arklone P" (i.e. trifluorotrichloroethane), chloroform, carbon tetrachloride, fluorobenzene, chlorobenzene, bromobenzene, o- and p-dichlorobenzene, hexachloroethane, perchloroethylene, and trichloroethylene, and the like, and mixtures thereof.

The solvent, of course, must be liquid at the conditions at which the process is operated, and also must be capable, in conjunction with a surfactant, of forming a suitable water-in-oil emulsion with the interior phase.

The transport agent will be chosen to be suitable for the nature of the dissolved species that it is desired to recover from the aqueous solution. Such transport agents are soluble in the water-immiscible exterior phase and are capable of interaction with the dissolved species at the aqueous solution-exterior phase interface to solubilise the dissolved species and are added in order to promote the permeation of the species through the exterior phase.

If it is desired to remove cations from an aqueous solution, a suitable ion exchange material may advantageously be incorporated in the exterior phase. Such an ion exchange material will usually be a compound selected from the group consisting of sulphonic acids, organic phosphonic acids, carboxylic acids, diketones and oximes. Preferably such materials are selected from polyfunctional sulphonic acids, polyfunctional carboxylic acids, polyfunctional organic phosphonic acids, oximes of α-hydroxy aliphatic ketones, and oximes of orthohydroxy aromatic ketones. Such ion exchange compounds generally have a molecular weight of from about 200 to about 10,000 and have a ratio of carbon atoms to functional groups of greater than 5. Examples of ion exchange compounds which are useful for transfer of ions through the exterior phase include sulphonated styrene co-polymers, petroleum sulphonic acids, naphthenic acids, sulphonated phenyl formaldehyde co-polymers, styrene-maleic acid co-polymers, styrene-acrylic acid co-polymers, and the like.

When it is desired to recover copper from an aqueous solution thereof, there may be used any of the reagents known to be suitable therefor, for example the reagents sold under the trade name LIX by General Mills Chemicals, Inc. Typical ion exchange materials that can be used in the recovery of copper from aqueous solutions thereof are described in papers by R. Price and J. Tumilty and by A. J. van der Zeeuw in "Hydrometallurgy", edited by G. A. Davies and J. B. Scuffham and published by The Institution of Chemical Engineers, being the proceedings of a Symposium held at the University of Manchester, Institute of Science and Technology on 2nd to 4th Apr., 1975. Such copper transport agents include the material known as Shell SME 529 copper extractant which is said to be a hydrocarbon solution of 2-hydroxy-5-nonyl acetophenone oxime. Also worthy of mention are LIX 34, LIX 63, LIX 64N, LIX 65 and Acorga series 5000 agents, e.g. Acorga 5100.

In the recovery of dissolved anions from aqueous feed solutions thereof the exterior phase will again usually comprise an ion exchange material. Such ion exchange materials can be, for example, compounds containing one or more basic groups capable of solubilizing the anion in the hydrophobic exterior phase at the aqueous feed solution-exterior phase interface to form a permeable species in the exterior phase. Examples of suitable ion exchange materials for use in recovery of anions include water-insoluble amines and polyamines such as those disclosed in U.S. Pat. No. 3,779,907. Certain phosphonium salts, e.g. alkyl triphenyl phosphonium salts, are soluble in water-immiscible solvents such as chloroform and can be considered for use as anion transport agents.

Generally speaking, simple ionic species, such as the cupric ion ($Cu^{++}$), are insoluble in hydrophobic, water-immiscible liquid media and are hence non-permeable in the exterior phase. When the exterior phase contains a suitable transport agent, such as Shell SME 529 copper extractant (designated for convenience as RH), reaction can take place at the aqueous feed solution-exterior phase interface according to the following equation:

$$Cu^{++} + 2RH \rightarrow CuR_2 + 2H^+ \qquad (1)$$

The complex $CuR_2$ is soluble in hydrocarbon solvents and is thus permeable in the exterior phase. At the interior phase-exterior phase interface the following reaction takes place when the interior phase is acidic, e.g. a sulphuric acid solution:

$$CuR_2 + 2H^+ \rightarrow Cu^{++} + 2RH \qquad (2)$$

The cupric ion dissolves in the interior phase and becomes non-permeable with respect to the exterior phase again. The overall effect of both reactions is the mass transfer of copper from the aqueous feed solution through the exterior phase into the interior phase and the mass transfer of hydrogen ions from the interior phase through the exterior phase to the aqueous feed solution. These processes will continue while there exists a pH differential between the interior phase and the aqueous feed solution and the interior phase has the lower pH value.

In the case of anion recovery, such as fluoride recovery, analogous processes take place. In this case the interior phase may comprise a source of anions, e.g. $FeCL_3$, while the feed solution contains fluoride ions. Whilst there is an appropriate ionic activity differential between the interior phase and the feed solution, the process will continue to transfer fluoride ions from the feed solution to the interior phase.

The above-mentioned cation and anion mass transfer processes will occur while there exists an appropriate ionic activity differential, for example a pH differential where cation mass transfer is involved, across the "liquid membrane" and are substantially independent of the concentration in either the interior phase or in the feed solution of the species being recovered. Hence the process of the invention is applicable both to dilute solutions, such as raffinates and other waste waters containing only a few parts per million of the dissolved species, and to more concentrated solutions, such as depleted electrolysis tank-house liquors. Thus, for example, the process can be applied in copper extraction to recovery of copper from a raffinate from a conventional solvent extraction plant containing about 100 parts per million of copper, using as the interior phase an acidic copper sulphate spent liquor from the electrolysis tank-house containing (say) about 30 grams per liter of copper, in order to raise the copper concentration of the interior phase to a level suitable for recirculation to the electrolysis tanks, (say) about 50 grams per liter of copper. The process is therefore applicable to the recovery of dissolved species from extremely dilute solutions, including solutions which are not amenable to treatment by conventional solvent extraction techniques, as well as to solutions which are amenable to conventional solvent extraction techniques.

In the formation of the emulsion the volume ratio of the interior and exterior phases can vary within wide limits. Thus, for example, the interior phase may comprise from about 20% by volume of the emulsion up to about 80% by volume of the emulsion. Generally the aqueous phase comprises from about 20 to about 60% by volume of the emulsion. The proportion of aqueous phase in the emulsion is determined at least to some extent by the nature and quantity of surfactant in the exterior phase, as well as by the nature of the solvent and of the transport agent.

The interior phase/exterior phase volume ratio in the emulsion determines at least to some extent the viscosity of the emulsion. Usually the higher this ratio is, the more viscous is the emulsion.

The emulsion must be sufficiently stable to prevent widespread rupture, during the contacting of the emulsion with the aqueous solution to be extracted, of the "liquid membrane" formed by the coating of exterior phase on the droplets of interior phase. If rupture of this "liquid membrane" occurs, bleeding of the components of the interior phase into the aqueous solution occurs. This can result in "bleeding back" into the aqueous solution of already extracted ionic species and loss of the acid or other components of the interior phase. However the emulsion should not be so stable that it cannot readily be broken by electrostatic coalescence.

The emulsion used in the process of the present invention may be prepared by various methods. Thus, for example, in the extraction of copper from aqueous solutions thereof, the hydrophobic solvent, the surfactant, and the transport agent or agents are blended and the appropriate volume of sulphuric acid solution is emulsified using a homogeniser or similar mixing device. Suitable mixing devices include colloid mills, valve homogenisers, ultrasonic generators and mixing jets.

In the case of copper recovery, the aqueous interior phase may comprise a solution containing sulphuric acid. The pH of the interior phase is maintained less than that of the aqueous solution to be extracted. The pH of the aqueous feed solution may lie in the range of from about 1 to about 12, such pH being maintained by addition of suitable quantities of sulphuric acid or ammonia, for example. If appreciable quantities of iron are present then the pH of the aqueous feed solution is desirably maintained below about 2.5. The concentration of acid in the interior phase may range from about 10 grams per liter or less of sulphuric acid up to about 250 grams per liter or more. However it is preferred to use as the interior phase a sulphuric acid solution containing not more than about 150 grams per liter. Concentrations of sulphuric acid in excess of about 250 grams per liter tend to suffer from the disadvantage that osmosis through the "liquid membrane" can occur leading to dilution of the interior phase and swelling of the emulsion. Such swelling of the emulsion is usually accompanied by an undesirable increase in viscosity of the emulsion leading to increased difficulty in stirring and in breaking of the emulsion electrostatically.

The quantity of surfactant in the emulsion may similarly vary within wide limits. Typically it will contain from about 0.01 to about 10% by weight of the surfactant based upon the weight of the exterior phase. Preferably, however, the exterior phase will contain at least 0.5% by weight, and usually at least about 1% by weight, of surfactant based upon the weight of exterior phase up to about 4% by weight. However the use of large amounts of surfactant is to be avoided so as not to make the emulsion so stable that it cannot be broken at an acceptable rate by electrostatic coalescence. An additional reason for avoiding the use of large amounts of surfactant is that in the contacting zone the surfactant will mainly be present, it is believed, at the exterior phase—interior phase and—feed solution interfaces (i.e. the inner and outer interfaces respectively) so that if too much surfactant is present it may hinder mass transfer across the interfaces as, for example, by tending to block access of the transport agent and complex to the outer and inner interfaces respectively. Thus it will usually be preferred to use from about 1 to about 2% by weight of surfactant based upon the weight of exterior phase.

The transport agent or agents may comprise from about 1 to about 99.9% by weight of the exterior phase. However it will usually be preferred to operate in the range from about 1 to about 10% by weight of transport agent based upon the weight of the exterior phase. Since the transport agent is usually a relatively expensive chemical it is preferred to operate at the lowest possible concentration of transport agent that gives acceptable recovery of the dissolved species under the reaction conditions employed and at short contact times.

The droplet size of the interior phase in the emulsion used in the process of the invention lies in the range of from about 0.3 micrometers to about 10 micrometers, usually from about 0.5 to about 5 micrometers, with the majority of the droplets lying in the range of from about 0.8 to about 3 micrometers, preferably in the range of from about 0.8 to about 1.5 micrometers. To achieve such droplet size it has been found preferable to use a homogeniser or emulsifying mill rather than a high speed turbine or similar mixer.

The emulsion and the aqueous solution to be treated by the process of the invention are contacted in a contacting zone. Such a contacting zone can be provided by a static mixer through which the emulsion and the solution to be treated are flowed. Alternatively the emulsion and the solution can be mixed in a conventional mixer such as is used in conventional solvent extraction plants. The contact time may vary within wide limits from about 1 second or less up to about 60 minutes or more. Preferably however the residence time in the contacting zone lies in the range of from about 5 seconds to about 25 minutes.

The optimum residence time in the contacting zone will be determined at least in part by the nature of the exterior phase, and in particular by the nature of any transport agent present, and by the nature of the dissolved species. This optimum period will be influenced by the reaction kinetics involved in the mass transfer process through the liquid membrane of the exterior phase, which are in turn influenced by the interior phase droplet size and the effective thickness of the liquid membrane. Thus the optimum residence time is dependent at least in part on the method used for formation of the emulsion, and on features such as the interior phase-:exterior phase volume ratio. It is of advantage to reduce the residence time as far as possible in the contacting zone consistent with efficient extraction of the desired dissolved species from the feed solution. The longer this residence time is, the larger the scale of the equipment must be that is needed for handling a given quantity or flow rate of the feed solution. Furthermore the longer the residence time is in the contacting zone the more risk there is of rupture of the liquid membrane of exterior phase and of loss of interior phase into the feed solution. Not only may such loss of interior phase result in loss of sulphuric acid or any other chemical added to the interior phase but it also results in "bleed back" of the already extracted species into the feed solution. Both factors reduce the overall efficiency of the process. Thus, overall, short residence times help to reduce the scale of the equipment and the associated running costs of the plant.

In the contacting zone the emulsion and aqueous solution to be treated are mixed at a shear rate sufficient to cause dispersion of the emulsion as "globules" in the aqueous solution to be treated so as to form a dispersion therein, but not so high a shear rate that extensive breakdown of the emulsion occurs. The size of the "globules" will be dependent on the method and rate of shearing as well as on the interior phase droplet size of the emulsion. The "globule" size may vary, for example, from about 100 micrometers or less up to about 10,000 micrometers or more. However, usually the "globules" will be from about 500 micrometers up to about 1500 micrometers in diameter under suitable mixing and shearing conditions in the contacting zone. Typically they are about 1000 micrometers in diameter. Preferably the emulsion is so formulated and the conditions in the contacting zone are so chosen that the breakdown of emulsion is less than about 1% (and preferably less than about 0.05%) at a residence time of about 18 minutes in the contacting zone. Where the interior phase comprises an acidic solution, breakdown of the emulsion can be monitored from measurements of the amount of the ionic species transferred to the interior phase and the decrease in pH of the aqueous solution being extracted after disengagement of the emulsion from the aqueous solution.

The volume ratio of feed solution to emulsion in the contacting zone can vary within wide limits, for example from about 1:50 or less up to about 50:1 or more. However it will usually be preferred to operate at a feed solution:emulsion volume ratio of from about 1:10 to about 10:1, for example about 5:1.

From the contacting zone the dispersion of emulsion in the aqueous solution is passed to a phase disengagement zone. This may take the form of a conventional gravity-settler.

Where the hydrophobic exterior phase comprises a hydrocarbon, the emulsion may float on the disengaged aqueous raffinate. However, if the hydrophobic exterior phase comprises a solvent having a specific gravity greater than 1, for example a chlorinated hydrocarbon having a specific gravity greater than 1, the emulsion may be heavier than the aqueous raffinate.

From the disengagement zone the emulsion is passed to an electrostatic coalescence zone in which the emulsion is subjected to an electrostatic field, thereby to cause "breaking" of the emulsion and agglomeration of the droplets of interior phase. Preferably the voltage gradient in the electrostatic coalescence zone exceeds at least about 1 kilovolt per centimeter. The voltage gradient may be as high as about 7.5 kilovolts per centimeter or more. Usually voltage gradients of the order of about 3 to about 5 kilovolts per centimeter suffice. Conveniently the electrostatic field is provided by imposing a high A.C. voltage across the emulsion. However D.C. voltages can be used if desired. One suitable form of apparatus comprises a pair of substantially horizontal parallel plate electrodes. Of this pair of electrodes one may be connected to earth and will usually lie in the coalesced interior phase. The other non-grounded, high voltage electrode of the pair will usually be so positioned that it does not lie in the coalesced interior phase.

Thus where the exterior phase is lighter than the interior phase the high voltage electrode is the upper electrode and is positioned in the coalesced exterior phase. When the exterior phase is heavier than the interior phase the lower electrode is made the high voltage electrode and is again positioned in the coalesced exterior phase.

In the electrostatic coalescence zone rapid "breaking" of the emulsion can be achieved when the emulsion is suitably tailored. Using parallel plate electrodes the coalescence rate for commercial operation should desirably be at least 0.1 U.S. gallons per square foot of the grounded electrode per minute (assuming a phase ratio of about 1:1 in the emulsion), and preferably at least 1 U.S. gallon per square foot of the grounded electrode per minute, at a voltage gradient of about 7.5 kilovolts per centimeter. If coalescence is slower than desired, some adjustment may be desirable to the composition of the exterior phase (e.g. a lower surfactant concentration should be used). Reduction of the interior phase/exterior phase volume ratio of the emulsion may be of assistance in increasing the rate of coalescence in the electrostatic field. This can be achieved by recycling exterior phase to the electrostatic coalescence zone.

Another suitable form of apparatus for providing the electrostatic coalescence zone comprises a vertical portion of tube with an axial high voltage A.C. or D.C. electrode and with a grounded electrode electrically insulated from the emulsion. If the tube itself is made of non-conductive material, e.g. glass, the grounded electrode can comprise a wire wound helically around the tube or a conductive layer or sheet wrapped round the tube.

The small droplet size (i.e. about 0.3 to about 10 micrometers, preferably about 0.5 to about 5 micrometers) of the interior phase in the emulsion and the narrow range of droplet sizes (i.e. the majority of the droplets lying in the range of about 0.8 micrometers to about 3 micrometers, preferably in the range of about 0.8 micrometers to about 1.5 micrometers) are important features of the present invention and have an extremely beneficial effect on the kinetics of mass transfer of the desired species from the aqueous feed solution through the liquid membrane into the interior phase and also on the stability of the emulsion. Since the droplet size of the interior phase in the emulsion is uniformly small, the surface area of the exterior phase—interior phase interface is extremely large. The surfactant in the exterior phase preferentially migrates to and is adsorbed at any interface between the hydrophobic exterior phase and an aqueous phase. Thus in the contact zone, in which the exterior phase—interior phase emulsion is contacted with the aqueous solution containing the species to be recovered, the effective "concentration" of the surfactant at the interior phase—exterior phase interface and at the exterior phase—aqueous solution interface is reduced, compared with an emulsion with larger interior phase droplets, for a given initial concentration of surfactant in the bulk exterior phase. This effective reduction of the "concentration" of surfactant adsorbed at the interfaces means that the molecules of the transport agent can more readily reach the interfaces for acceptance of, or release of, the species to be transported across the liquid membrane into or from the interior phase. Since there is less blocking at the interfaces by surfactant the transfer of the species across the interfaces to and from the transport agent is facilitated, which means in turn that the kinetics of the reaction are favourably affected.

Furthermore the small interior phase droplet size means that, compared with an emulsion having the same phase ratio but larger droplets, the effective membrane thickness is reduced. Since the distance across which the species to be recovered has to be transported is reduced, the speed of transfer is increased, leading once again to a favourable effect on the reaction kinetics.

Since the kinetics of transfer are improved by use of small interior phase droplets, the residence time of the emulsion in the contact zone can be reduced. By appropriate choice of transport agent, surfactant, surfactant level and the like factors, it is possible in many cases to effect efficient recovery of the desired species from the aqueous feed solution thereof using contact times of 20 minutes or less. In favourable cases contact times of only 1 or 2 minutes are sufficient. Because the residence time of the emulsion in the contact zone is short, it is not necessary to take any special measures to increase the emulsion stability, e.g. by addition of viscosity increasing additives to the exterior phase. Indeed the use of viscosity increasing additives is to be avoided in the preferred practice of the invention since such additives tend to hinder the rapid transfer of the species through the liquid membrane.

A further advantage of the use of the uniformly small droplet size of the dispersed interior phase of the emulsion that is adopted according to the invention is that, because residence time of the emulsion in the contact zone can be reduced, a corresponding reduction in emulsion swell due to osmosis can be achieved.

Using a liquid membrane system formulated for extraction of copper, experiments have been carried out to demonstrate the superiority of emulsions produced using a high speed homogeniser compared with an axial flow turbine operating at a tip speed of 730 cm/s. Apart from the method of emulsification, all other features of the membrane system were identical. Use of the homogeniser produced droplets of interior phase of from about 0.3 to about 5 micrometers with the majority of the droplets lying in the range of from about 0.8 to 1.5 micrometers; the axial flow turbine produced some small sized interior phase droplets of the order of 1 micrometer in diameter but a much broader distribution of droplet sizes with many droplets of larger size, of the order of 10 to 20 micrometers in diameter. The resulting emulsions were contacted under identical conditions with a feed solution containing 300 ppm copper as copper sulphate at a pH of 1.5–2.0. The interior phase was a solution of sulphuric acid and the exterior phase contained surfactant and a copper transport agent. The results are shown in FIGS. 1 and 2 of the accompanying drawings.

Figure 2:
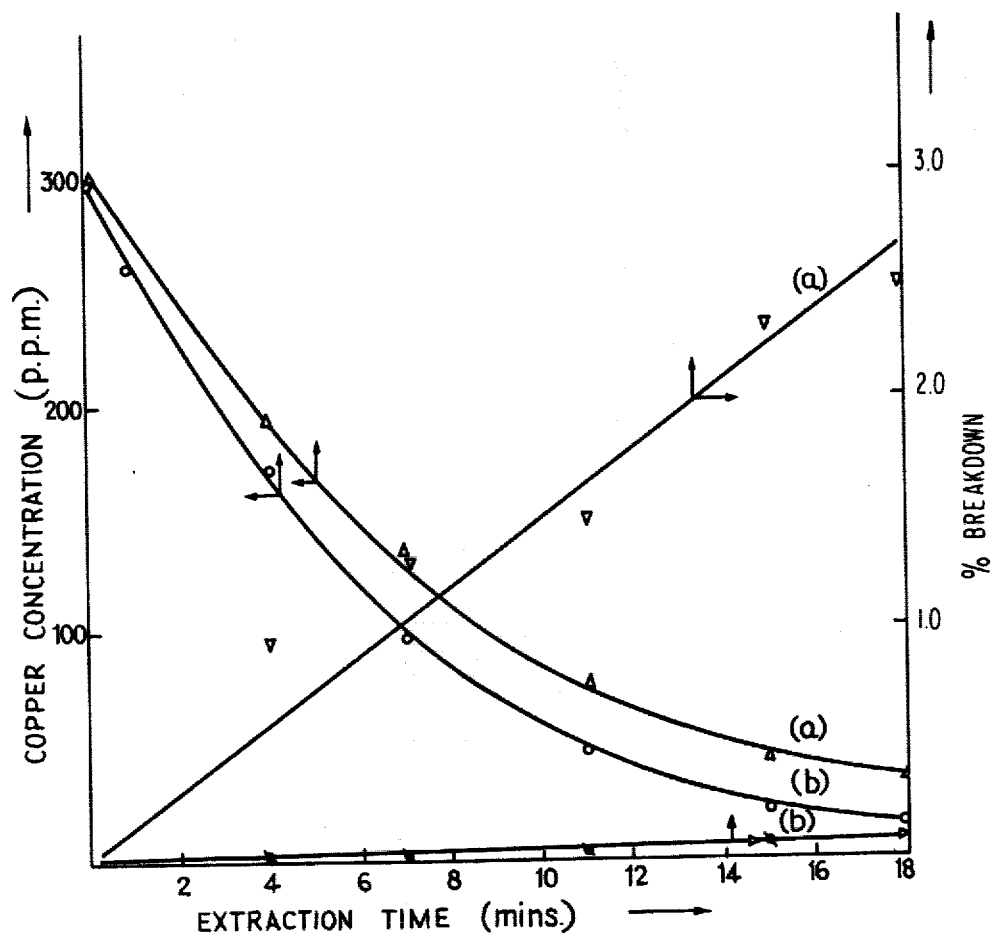

In FIG. 2 the curves labelled (a) and (b) plot the copper concentration in the feed solution (shown on the left hand y-axis) against time (shown on the x-axis) for the emulsions prepared with the axial flow turbine mixer and with the homogeniser respectively. As can be seen from these curves the extraction efficiency of the homogenised emulsion is significantly improved. More striking however, is the improvement in emulsion breakdown characteristics, as shown by the straight lines (a) and (b) in FIG. 2. Again line (a) illustrates the performance of the emulsion produced with the axial flow turbine mixer whilst line (b) illustrates the performance of the homogenised emulsion. After 18 minutes' extraction the percentage breakdown of the emulsion produced with the axial flow turbine is more than 30 times more than the percentage emulsion breakdown of the homogenized emulsion. This demonstrates well the superiority of the small droplet size and the narrow distribution of droplet sizes used in the present invention.

The invention utilises electrostatic coalescence for breaking the emulsion. This is advantageous compared with other techniques for emulsion breaking such as the addition of solvents (as described in U.S. Pat. No. 4,001,109) and the use of centrifuges; not only is the electrostatic technique simple and economical to operate, but also there is no need to add solvents or other chemicals which must be separated from the coalesced phases before these can be recycled to the emulsification zone. Furthermore the equipment is simple and does not require such a large capital outlay as would be required for an equivalent number of centrifuges and the consumption of power is small.

When using emulsions with droplets of interior phase larger than the preferred size, e.g. when using emulsions with droplets of interior phase in the range of from about 10 micrometers up to about 20 micrometers in diameter, the power required for electrostatic coalescence tends to fluctuate, thus leading to decreased efficiency. However, it has been found that emulsions with interior phase droplets in the preferred size range of from about 0.5 micrometers to about 5 micrometers undergo electrostatic coalescence smoothly and efficiently with a small power consumption. Such emulsions have droplets of a relatively uniform size; thus, for example, emulsions have been prepared with an average droplet size of about 1 micrometer with the majority of all droplets lying within the range of from about 0.8 to about 1.5 micrometers and only a very small fraction of droplets lying outside this range.

Close control of the shear rate during emulsification and of the composition of the exterior phase (e.g. surfactant concentration) is therefore desirable in order to produce an emulsion having a droplet size in the preferred range of from about 0.5 micrometers to about 5 micrometers. By and large it is best to avoid paddle mixers and similar relatively inefficient mixers and to use a homogeniser or similar efficient mixing device.

The coalesced interior phase from the electrostatic coalescence zone contains, under appropriate circumstances, an enhanced content of the dissolved species compared with the aqueous feed solution, whilst the disengaged aqueous raffinate is substantially completely depleted in the dissolved species. Thus, for example, in experiments using feed solutions containing from about 4 to about 1,200 parts per million of copper calculated as copper, it is possible to recover a coalesced interior phase having a copper concentration of from about 2,500 to about 25,000 parts per million of copper or more. Such solutions can be directly used for recovery of copper by electrolysis using conventional electrolysis tank-house techniques.

In a conventional solvent extraction technique the aqueous feed solution is contacted with the liquid "ion exchanger" (for example a LIX reagent) in a conventional mixer-settler at a volume ratio of from about 1:1 to about 1:2 followed by separation of the phases in the settler part of the mixer-settler and stripping of the organic phase, again at a volume ratio of from about 1:1 to about 1:2, in a second mixer-settler followed by settling of the phases and separation of the strip liquor now loaded with the desired ionic species. This conventional process requires a large inventory of solvent and ion exchanger and necessitates the use of two mixer-settlers. In each mixer-settler the concentrations of the desired species in the organic and aqueous phases are equilibrium concentrations. Several extraction and strip stages may be required in order to maximise recovery of the desired species.

When using the process of the present invention the volume ratio of the hydrophobic exterior phase to the aqueous feed solution to be treated may be chosen such that the reagent:raffinate ratio lies in the range of from about 1:250 to about 1:4000. Thus in order to treat the same volume of feed solution a much smaller inventory of solvent and ion exchange material is required using such a process in accordance with the present invention compared with the conventional solvent extraction techniques.

The process of the present invention may be operated at any temperature at which the emulsion and the aqueous feed solution are fluid and stable; conveniently, ambient temperatures are used. The pressure must likewise be sufficient to maintain the fluidity of the various phases; conveniently, ambient pressures are used.

The process of the invention may be carried out batchwise, but is preferably carried out on a continuous basis. Single or multi-stage operation may be used as appropriate.

Figure 3:
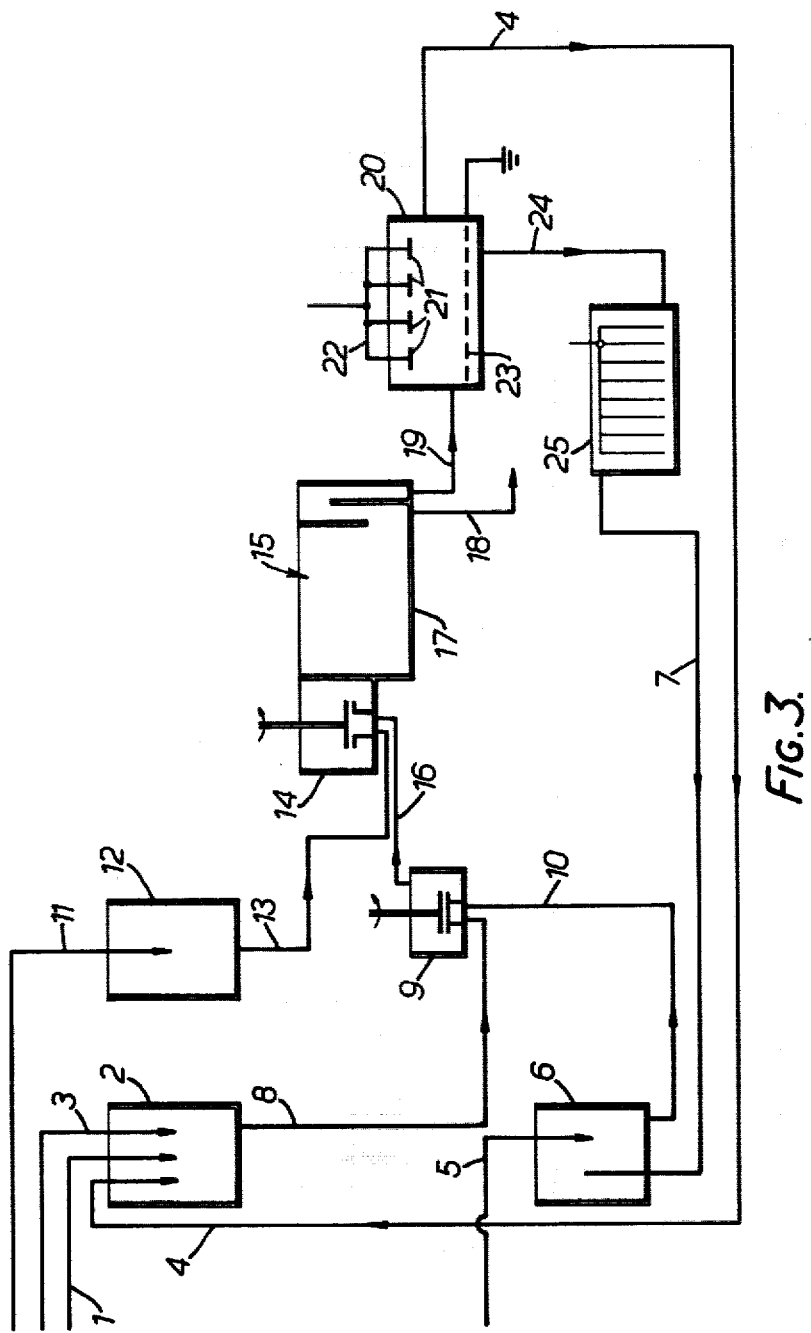

FIG. 3 of the accompanying drawings illustrates diagrammatically a flow sheet incorporating the process of the invention.

Referring to FIG. 3, make-up emulsifier is supplied by line 1 to holding tank 2. Make-up solvent and make-up transport agent are supplied via line 3 to holding tank 2. A recycled mixture of emulsifier, solvent and transport agent is fed to holding tank 2 by line 4.

Make-up acid is fed via line 5 to holding tank 6, whilst recycled acid is returned to holding tank 6 via line 7.

The mixture of emulsifier, solvent and transport agent is fed from holding tank 2 via line 8 to homogeniser mill 9 to which is also fed acid via line 10. In this way the desired water-in-oil emulsion is formed in which the droplet size of the interior phase of the emulsion lies in the range of from about 0.3 micrometer to about 10 micrometers, with the majority of the droplets lying in the range of from about 0.8 to about 1.5 micrometers.

The aqueous solution to be treated, for example a copper ore leach liquor is fed via line 11 to holding tank 12 and thence via line 13 to a mixing compartment 14 of a conventional mixer-settler 15. Emulsion from homogeniser mill 9 is also fed to mixing compartment 14 via line 16. The flow rates of aqueous feed solution through line 13 and of emulsion through line 16 are adjusted to give the desired residence time in the mixing compartment 14 of mixer-settler 15 and the desired emulsion:feed solution ratio.

From mixing compartment 14 the resulting dispersion consisting of globules of emulsion dispersed in a continuous aqueous phase is fed to settling compartment 17 of mixersettler 15. Bulk separation of the phases occurs in settling compartment 17 and the aqueous phase is discharged via line 18. The raffinate can be recycled to the leaching site after addition of the appropriate amount of make-up acid.

The globules of emulsion in the dispersion agglomerate and are discharged from settling compartment 17 via line 19, which leads to an electrostatic coalescer 20. This contains a number of electrodes 21 which are connected to a bus-bar 22 which is maintained at a high positive potential. Reference numeral 23 illustrates an earthed ground electrode. In the electrostatic coalescer the droplets of interior phase coalesce and the coalesced interior phase is withdrawn via line 24 whilst the exterior phase is withdrawn via line 4 and returned to holding tank 2 for recycling.

The coalesced interior phase in line 24 then passes to a conventional electrolysis cell 25 where electrowinning is carried out in a conventional manner. Spent liquor discharged from cell 25 is recycled to holding tank 6 via line 7.

As illustrated the plant is arranged to operate with a solvent, for example a hydrocarbon solvent which produces an emulsion that is lighter than water. It is, however, possible to modify the plant of the drawing so as to permit operation of the plant with a solvent that produces an emulsion that is heavier than water, for example a chlorinated hydrocarbon solvent such as "Arklone P". In this case the emulsion is withdrawn via line 18 and the aqueous raffinate via line 19, line 18 being connected to the electrostatic coalescer 20 which is itself inverted so that the electrodes 21 are in the organic phase rather than in the conducting coalesced interior phase.

The invention is further illustrated in the following Examples.

EXAMPLE 1

(a) Synthesis of the emulsion

A solution was prepared in Napoleum 470 containing 1% by weight of Span 20, a commercial name for sorbitan monolaurate, and 10% v/v Shell SME 529. 20 ccs of this exterior phase were transferred to a wetted 100 cc beaker. While stirring at a low speed with an "Ultra-Turrax" homogeniser, 30 ccs of 0.375 M $H_2SO_4$ solution were added dropwise from a burette. This transfer took about 1½ minutes, after which the homogeniser stirring speed was increased to maximum and the mixture was left to emulsify for 8 minutes. The resulting water-in-oil emulsion had an average interior phase droplet size of about 1 micrometer. Very few droplets were less than 0.8 micrometers or more than 1.5 micrometers in diameter and virtually none were larger than 5 micrometers in diameter.

(b) Contact of the emulsion with the aqueous feed solution 250 ccs of an aqueous feed solution containing 120 parts per million cupric ions as copper sulphate were transferred to a wetted 500 cc beaker fitted with baffles. While stirring with a turbine at 300 r.p.m. the homogenised emulsion was poured into the stirred aqueous copper-containing solution and a stopwatch started. The beaker containing emulsion was allowed to drain into the copper-containing feed solution for 30 seconds. The stirrer motor was fitted with a stroboscope and its speed was measured using a photoelectric cell connected to a portable tachometer. Control of the rotational speed of the turbine was achieved using a variable rheostat. The turbine had an overall diameter approximately one half of the internal diameter of the beaker and was located coaxially with the beaker so that the turbine was approximately at the interface between the emulsion and the feed solution when stirring was stopped and the emulsion allowed to separate under gravity. After stirring for 20 minutes the liquid mixture was transferred to a separating funnel and allowed to separate under gravity. The raffinate, which now contained about 1 part per million of copper, was discarded.

(c) Breakdown of emulsion

The emulsion was run into a cylindrical glass container having an internal diameter of about 5 centimeters. This container was arranged with its axis vertical and was fitted with an axial electrode in the form of a copper wire. The outside of the cylindrical container was wound with an earthed copper wire. Upon raising the potential of the central electrode to 20,000 volts A.C. rapid coalescence of the emulsion occurred, resulting in complete separation of the phases within about 30 seconds. The measured current was about 0.3 milliamps. The voltage gradient was about 7.2 kilovolts per centimeter. The copper concentration of the coalesced aqueous interior phase was about 1,000 parts per million in cupric ion.

The amount of emulsion breakdown occurring during the contacting step was estimated from pH measurements and from the amount of copper transferred from the feed solution to the interior phase of the emulsion to be less than about 0.05% under the rotation conditions employed.

EXAMPLE 2

The procedure of Example 1 is repeated using 1.5 M $H_2SO_4$ solution in place of the 0.375 N $H_2SO_4$ solution and an aqueous solution containing 3600 parts per million of copper ion as copper sulphate as the aqueous feed solution. The copper concentration of the resulting coalesced aqueous interior phase is about 30,000 parts per million. This coalesced aqueous interior phase can be electrolysed in a conventional manner according to conventional electrowinning techniques to recover copper metal at the cathode.

What is claimed is:

1. In a liquid membrane process for the recovery of a dissolved species from an aqueous solution thereof which comprises:
   providing an emulsion comprising droplets of an aqueous interior phase surrounded by a hydrophobic exterior phase which is immiscible with the aqueous solution, which is permeable to said species, and which contains a non-ionic oil-soluble surfactant, the aqueous interior phase comprising a component capable of rendering said species non-permeable;
   mixing the aqueous solution with the emulsion thereby to effect intimate contact therebetween and to permit said species to permeate the exterior phase, to desorb from the exterior phase into the interior phase, and to be rendered non-permeable in the interior phase;
   separating the emulsion from the aqueous solution now depleted in said species;
   breaking the separated emulsion thereby to effect coalescence of the aqueous interior phase; and
   recovering coalesced interior phase containing said species,
   the improvement comprising:
   forming the emulsion by emulsifying the aqueous interior phase in the hydrophobic exterior phase under controlled shear conditions so as to produce droplets of interior phase in the hydrophobic exterior phase substantially all of a size lying in the range of from about 0.3 to about 10 micrometers with the majority of the droplets distributed over the range of from about 0.8 to about 3 micrometers; and
   breaking the separated emulsion by subjection to an electrostatic field.

2. A process according to claim 1 in which the dissolved species is an ionic species and in which the exterior phase comprises a solution in a hydrophobic solvent of an oil-soluble surfactant having an HLB ratio in the range of from about 1.75 up to about 7 and of a transport agent for the ionic species.

3. A process according to claim 2, in which the surfactant has an HLB ratio in the range of from about 3.5 to about 6.

4. A process according to claim 1, in which the exterior phase comprises from about 0.1 to about 4% by weight of an oil-soluble surfactant having an HLB ratio in the range of from about 3.5 to about 6.

5. A process according to claim 1 in which the period of contact of the aqueous solution with the emulsion lies in the range of from about 5 seconds to about 25 minutes.

6. A process according to claim 1, in which the droplet size of the interior phase in the emulsion lies in the range of from about 0.5 to about 5 micrometers with the majority of the droplets lying in the range of from about 0.8 to about 1.5 micrometers.

7. A process according to claim 1, in which the voltage gradient in the electrostatic field is in excess of about 1 kilovolt per centimeter up to about 7.5 kilovolts per centimeter or more.

8. A process according to claim 1, in which the dissolved species comprises copper ions and in which the aqueous interior phase comprises an acidic solution having a pH less than that of said aqueous solution.

9. A process according to claim 1, wherein the majority of the droplets of the interior phase lie in the range of from about 0.8 to about 1.5 micrometers.

10. In a continuous process for the recovery of a dissolved species from an aqueous feed solution thereof which comprises:
    supplying to an emulsification zone a hydrophobic exterior phase which is immiscible with the aqueous solution, which contains an oil-soluble surfactant and a hydrophobic organic solvent, and which is permeable to said species, and an aqueous interior phase which comprises a component adapted to promote the desorption of said species from the exterior phase into the interior phase;
    mixing the interior and exterior phases in said emulsification zone so as to form therein a water-in-oil type emulsion;
    contacting the aqueous solution with the water-in-oil type emulsion in a contact zone so as to permit said species to permeate the exterior phase, to desorb from the exterior phase into the interior phase and to be rendered non-permeable in the interior phase;
    separating emulsion from the aqueous solution in a separation zone, the aqueous solution now being depleted in said species;
    breaking separated emulsion in an emulsion breaking zone;
    recovering from the emulsion breaking zone oil-soluble surfactant and solvent, as well as coalesced interior phase containing said species; and
    recycling oil-soluble surfactant and solvent to the emulsification zone;

the improvement comprising:

effecting said mixing step under controlled shear conditions so as to form in said emulsification zone a water-in-oil type emulsion having an interior phase droplet size in the range of from about 0.3 micrometers up to about 10 micrometers with the majority of the droplets distribute over the range of from about 0.8 to about 3 micrometers;

passing separated emulsion from the separation zone to an electrostatic coalescence zone in which an electrostatic field is maintained so as to effect coalescence of droplets of the interior phase;

recovering from the electrostatic coalescence zone exterior phase and coalesced interior phase containing said species; and recycling exterior phase to the emulsification zone.

11. A process according to claim 10, including the further steps of recovering said species from said coalesced interior phase and recycling interior phase now depleted in said species to said emulsification zone.

12. A process according to claim 10, in which the dissolved species is an ionic species and in which the exterior phase comprises a solution in a hydrophobic solvent of an oil-soluble surfactant having an HLB ratio in the range of from about 1.75 up to about 7 and of a transport agent for the ionic species.

13. A process according to claim 12, in which the surfactant has an HLB ratio in the range of from about 3.5 to about 6.

14. A process according to claim 10, in which the exterior phase comprises from about 0.1 to about 4% by weight of an oil-soluble surfactant having an HLB ratio in the range of from about 3.5 to about 6.

15. A process according to claim 10, in which the droplet size of the interior phase in the emulsion lies in the range of from about 0.5 to about 5 micrometers with the majority of the droplets lying in the range of from about 0.8 to about 1.5 micrometers.

16. A process according to claim 10, in which the emulsification zone comprises a homogeniser or emulsifying mill.

17. A process according to claim 10, in which the dissolved species comprises copper ions, in which the interior phase comprises an acidic solution, having a pH less than that of the aqueous solution, in which coalesced interior phase recovered from the electrostatic coalescence zone is subjected to electrolysis for the recovery of copper and in which interior phase after electrolysis is recycled to the emulsification zone.

18. A process according to claim 10, in which shear conditions are maintained in the contact zone such that a dispersion of "globules" of emulsion in the aqueous solution is produced, the "globules" being from about 500 micrometers up to about 1500 micrometers in diameter.

19. A process according to claim 10, in which the volume ratio of aqueous solution to emulsion in the contacting zone lies in the range of from about 1:10 to about 10:1.

20. A process according to claim 10, wherein the majority of the droplets of the interior phase lie in the range of from about 0.8 to about 1.5 micrometers.

* * * * *